United States Patent
Goehlich et al.

(10) Patent No.: US 9,452,561 B2
(45) Date of Patent: Sep. 27, 2016

(54) METHOD OF PRODUCING A COMPOSITE SHELL ELEMENT, COMPOSITE SHELL ELEMENT, MEANS OF TRANSPORT AND USE

(71) Applicant: Airbus Operations GmbH, Hamburg (DE)

(72) Inventors: Robert Alexander Goehlich, Hamburg (DE); Matthias Van Hove, Luxembourg (LU)

(73) Assignee: AIRBUS OPERATIONS GMBH, Hamburg (DE)

( * ) Notice: Subject to any disclaimer, the term of this patent is extended or adjusted under 35 U.S.C. 154(b) by 1 day.

(21) Appl. No.: 14/063,283

(22) Filed: Oct. 25, 2013

(65) Prior Publication Data

US 2014/0134377 A1    May 15, 2014

Related U.S. Application Data

(60) Provisional application No. 61/723,343, filed on Nov. 7, 2012.

(30) Foreign Application Priority Data

Nov. 7, 2012   (EP) .................................... 12191653

(51) Int. Cl.
| | |
|---|---|
| *B29C 53/00* | (2006.01) |
| *B29C 53/04* | (2006.01) |
| *B29C 70/54* | (2006.01) |
| *B29C 35/02* | (2006.01) |
| *B32B 3/06* | (2006.01) |

(52) U.S. Cl.
CPC ........... *B29C 53/04* (2013.01); *B29C 35/0266* (2013.01); *B29C 70/543* (2013.01); *B32B 3/06* (2013.01); *Y10T 428/19* (2015.01)

(58) Field of Classification Search
CPC . B29C 53/05; B29C 70/543; B29C 35/0266; B32B 3/06; Y10T 428/19
See application file for complete search history.

(56) References Cited

U.S. PATENT DOCUMENTS

| | | |
|---|---|---|
| 2009/0022940 A1 | 1/2009 | Weber et al. |
| 2011/0198020 A1 | 8/2011 | Marengo et al. |
| 2012/0286093 A1 | 11/2012 | Noebel |

FOREIGN PATENT DOCUMENTS

GB    2265854 A    10/1993

OTHER PUBLICATIONS

European Searching Authority, European Search Report for EP 12 191 653.0 Dated Mar. 22, 2013.

*Primary Examiner* — Moshe Wilensky
(74) *Attorney, Agent, or Firm* — Lorenz & Kopf, LLP

(57) ABSTRACT

Systems and methods for fabrication of composite shell elements and to the assembly of large scale structures comprising such composite shell elements are provided. The composite shell elements comprise two regions in which the resin is cured to different levels. As a consequence, the flexibility of the first region is greater than the flexibility of the second region. Since the first region defines a bending line, the composite shell element can be deformed along the bending line during assembly of the large scale structure. Thus, tolerances in fabrication of the composite shell elements may be compensated for in a time-efficient manner without the need for applying a shimming process.

11 Claims, 3 Drawing Sheets

METHOD OF PRODUCING A COMPOSITE SHELL ELEMENT, COMPOSITE SHELL ELEMENT, MEANS OF TRANSPORT AND USE

CROSS-REFERENCE TO RELATED APPLICATION

This application claims priority to European Patent Application 12 191 653.0, filed on Nov. 7, 2012 and to U.S. Provisional Patent Application No. 61/723,343 filed on Nov. 7, 2012, which are each incorporated herein by reference in their entirety.

TECHNICAL FIELD

The technical field relates to the field of composite shell elements. In particular, the technical field relates to a method of producing a composite shell element, to a composite shell element, to a means of transport and to particular uses of a composite shell element produced by such a method.

BACKGROUND

Large scale structures, such as the fuselage or the wing of an aircraft, the body of a carrier rocket, the module of a space station, or the mast of a wind power plant may comprise composite shell elements forming the outer shell of the large scale structure. Such composite shell elements may be formed of fibre-reinforced composite material, for example carbon fibre reinforced plastic.

DE 10 2009 060 695 A1 and WO 2011/080286 A3 describe the fuselage of an aircraft comprising such a fibre-reinforced composite material.

During production of carbon fibre reinforced plastic shell elements or other composite shell elements, such as fuselage skin panels, the shape of the shells may deviate from the perfect, theoretical shape by several millimeters. Gaps arising between neighboring shell elements, when the shell elements are assembled to form a shell section of the large scale structure, need to be closed, for example by performing a laborious tolerance compensation process at Major Component Assembly (MCA) level.

For example, the gaps may be filled manually with liquid or solid shimming and/or sealant material. After the time-consuming application of the sealant, the production lead time may be subject to a further increase due to the curing time of the sealant, before the manufacturing of the joints can be finalized.

In addition, other objects, desirable features and characteristics will become apparent from the subsequent summary and detailed description, and the appended claims, taken in conjunction with the accompanying drawings and this background

SUMMARY

According to various exemplary embodiments, provided is a method to reduce the lead time for producing a fuselage comprising composite shell elements.

In various embodiments, the present disclosure provides a method of producing a composite shell element, a composite shell element produced by such a method, a means of transport, the use of a composite shell element for building an aircraft or a carrier rocket and the use of a composite shell element for building a mast of a wind power plant.

According to one of various aspects of the present disclosure, a method of producing a composite shell element is provided, in which a first region of the composite shell element comprises a resin of the composite shell element which is cured to a first degree. Furthermore, a second region of the composite shell element is provided in which the resin of the composite shell element is cured to a second degree which is higher than the first degree. Since the resin in the first region is cured to a lower degree than the resin in the second region and it may be more flexible. As a consequence, the flexibility of the first region is greater than the flexibility of the second region. It should be noted that the first region defines a bending line along which the composite shell element can be folded or bent.

Such a bending line allows the composite shell element to be locally shaped or deformed, i.e., bent or folded, in order to change the outer contour of the shell element shortly before or during assembly of the large scale structure.

In other words, a bending of the shell element is allowed at MCA level in order to enable a flexible adjustment of the shell element when joining two shell elements during assembly of the large scale structure.

According to another one of various aspects of the present disclosure, a method of forming a large scale structure comprising a plurality of composite shell elements is provided, the method comprising: Providing a plurality of first regions of a first composite shell element in which a resin of the composite shell element is cured to a first degree; and providing a plurality of second regions of the first composite shell element in which the resin of the composite shell element is cured to a second degree which is higher than the first degree, such that a flexibility of the first region is greater than a flexibility of the second region.

Each first region defines a bending line along which the first composite shell element is foldable.

Further possible steps are: Assembling the plurality of shell elements to form the large scale structure; and deforming the first composite shell element in the area of at least one of the bending lines in order to close a gap between two composite shell elements.

According to an exemplary embodiment of the present disclosure, the first region has an elongated shape which runs from one edge of the composite shell element to another edge of the composite shell element.

For example, the first region is arranged in longitudinal direction of the composite shell element. In case of an aircraft fuselage, the longitudinal direction of the composite shell element is the longitudinal axis of the fuselage, i.e., the flight direction.

According to another exemplary embodiment, the first region is arranged in transversal direction of the composite shell element. In case the large scale structure is an aircraft fuselage, the transversal direction is the circumferential direction of the fuselage.

According to another exemplary embodiment, the first region comprises a curved section. It should be noted that the composite shell element may comprise more than one region in which the resin is cured to the first degree. It may also comprise regions, in which the resin is cured to a degree different from the first and second degree, but to a degree which is lower than the second degree. By doing so, regions may be defined with different flexibilities and thus different bending properties.

The second region may be much larger than the first region/first regions. In other words, the composite shell element may be completely cured in most areas. However, there may be one or more comparatively small (first) regions in which it is not completely cured and which regions define one or more bending lines, which may be straight lines, curved lines or a mixture thereof. The different bending lines may or may not intersect each other.

According to another exemplary embodiment of the present disclosure, the composite shell element has a greater thickness in the first region than in the second region. In order to obtain the desired bending capability at MCA/Final Assembly Line (FAL) level, a local thickening of the composite shell element is applied, for example, in longitudinal direction thereof.

The curing cycle may be performed in such a way, that the core area within the thickened part is not entirely cured. Therefore, after the first curing cycle, this area is still "wet" and will thus allow for a minor deformation in the region of the bending lines.

Finally, a second curing cycle may be performed, at least locally, in order to yield the final tolerance compensated shape of the shell element, of the shell section (which is formed by two or more shell elements) and of the complete large scale structure, i.e., the fuselage, the mast, the carrier rocket, the space station module, for example.

According to another exemplary embodiment of the present disclosure, the method further comprises providing a first resin in the first region and providing a second resin in the second region, wherein the first resin has a different curing property than the second resin. In other words, the first resin may cure at a different temperature than the second resin and/or may need a longer curing time than the second resin.

By employing two distinct resins in the composite shell element it may be achieved that the first region has a higher flexibility than the second region after the first curing cycle.

According to another exemplary embodiment of the present disclosure, the resin in the first region is cured at a different temperature than the resin in the second region. This is for example achieved by providing local heat shields or cooling devices during curing which are arranged close to the first region but not so close to the second region.

It should be noted that the above-described ways to achieve that the resin in the first region is cured to a different degree than the resin in the second region may be combined with each other.

According to another exemplary embodiment of the present disclosure, the composite shell element is bent along the bending line defined by the first region, thereby compensating for tolerances, i.e., gaps between neighboring composite shell elements.

According to another exemplary embodiment of the present disclosure, a final curing of the resin in the first region is performed after bending.

According to another exemplary embodiment of the present disclosure, the method further comprises assembling a multi-component structure comprising at least two composite shell elements produced by one or more of the above-described methods.

This multi-component structure may be a large scale structure, such as, for example, an aircraft fuselage, an aircraft wing, a carrier rocket, or the mast of a wind power plant.

It may also be a module of a space station or the fuselage of a means of transport, such as a train, a car, a truck, a bus, helicopter, a space vehicle, an airship, a ship or a boat.

According to another aspect of the present disclosure, a composite shell element is provided which is produced by the above and below described method, wherein the composite shell element is a carbon fibre reinforced plastic shell element.

According to another aspect of the present disclosure, a means of transport is provided, which comprises a composite shell element produced by the method described above and below.

According to another aspect of the present disclosure, the use of a composite shell element produced by the method described above and below for building an aircraft or a carrier rocket or a wind power plant or a module of a space station is provided.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
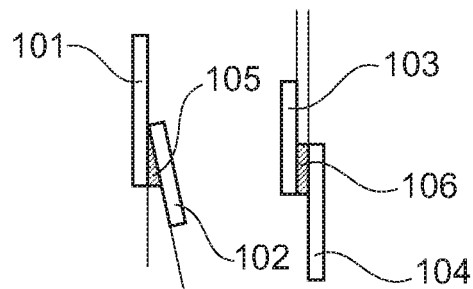
FIG. 1 shows shell elements joined to each other during assembly of a large scale structure, such as an aircraft fuselage.

The following detailed description is merely exemplary in nature and is not intended to limit the present disclosure or the application and uses of the present disclosure. Furthermore, there is no intention to be bound by any theory presented in the preceding background or the following detailed description.

The illustration in the drawings is schematically. If the same reference numerals are used in different drawings, they refer to similar or identical elements. However, similar or identical elements may also be referred to by different reference numerals.

FIG. 1 shows shell elements 101, 102, 103, 104 joined to each other during assembly of a large scale structure, such as an aircraft fuselage. The shell elements may be formed of carbon fibre reinforced plastic and fabricated before fuselage assembly. Due to tolerances in the production process, wedge-like gaps 105 or rectangular gaps 106 may arise between neighboring shell elements.

Intolerances in pre-fabricated carbon fibre reinforced plastic shell elements may lead to many difficulties at MCA level, for example the need for performing a shimming process for tolerance compensation.

The gaps 105, 106 may need to be filled manually with liquid or solid shimming and sealant material, which can be a time-consuming and thus costly process. Furthermore, this process may result in additional weight.

Figure 2:
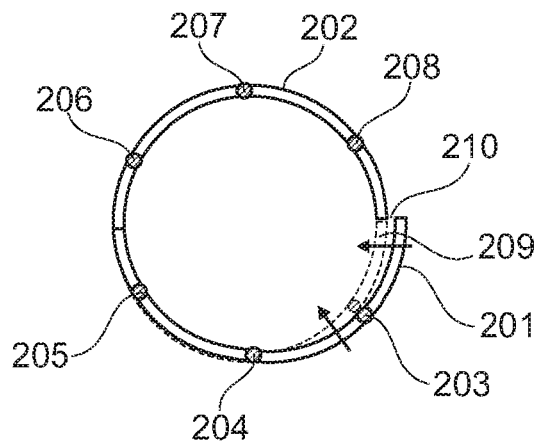
FIG. 2 shows an assembly process according to an exemplary embodiment of the present disclosure.

FIG. 2 shows a cross-sectional view of a large scale structure, such as a fuselage section comprising two shell elements 201, 202.

Both shell elements comprise one or more "first regions" in which the resin is cured to a lower degree than the resin in the other regions. For example, the lower shell element 201 comprises three longitudinally arranged first regions 203, 204, 205 which define bending lines along which the composite shell element 201 can be deformed. The upper, second shell element 202 comprises three longitudinally arranged first regions 206, 207, 208 which also define bending lines.

It should be noted that the "first regions" may have the form of straight lines and may be arranged longitudinally, i.e., in direction of the fuselage main axis. They may also be arranged circumferentially around the fuselage.

Each first region defines an individual bending node, also called bending area or bending line, along which the shell element can be deformed during fuselage assembly. Such a bending process is symbolized by the two arrows in the lower right quarter of the sectional view. As can be seen from FIG. 2, there is a deviation of the lower shell element 201 from its intended shape (depicted by dotted line 209). By bending the lower shell element 201 in the regions 203, 204 and/or 205, the ideal shape 209 may be approximated, thereby closing the gap 210 between the lower shell element 201 and the upper shell element 202.

Bending of the composite shell elements at MCA level may provide for a compensation of manufacturing intolerances and may thus avoid costly post-treatment, i.e., shimming/gap closure processes.

This may reduce the lead time and may result in an overall weight reduction of the fuselage section.

Figure 3:
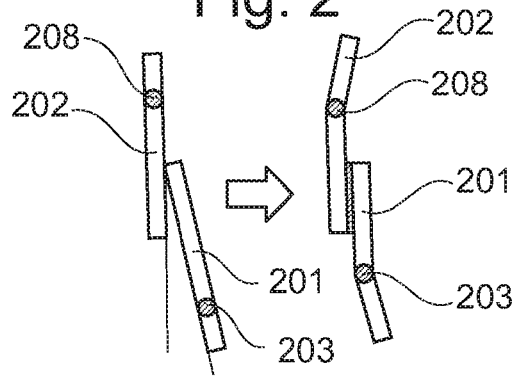
FIG. 3 shows an assembly process according to an exemplary embodiment of the present disclosure.

FIG. 3 shows two shell elements 201, 202 during assembly. The situation depicted on the left side of FIG. 3 corresponds to the situation on the left side of FIG. 1, where the end sections of the two shell elements 201, 202 enclose an angle, i.e., the overlapping end sections of the two shell elements are not parallel to each other.

By bending the lower end section of the upper shell element 202 around bending line 208 in counterclockwise direction and by bending the upper end section of the lower shell element 201 around bending line 203 in clockwise direction, the shell sections can be transformed as depicted on the right-hand side in FIG. 3, where the lower end section of the upper shell element 202 and the upper end section of the lower shell element 201 are parallel to each other such that the wedge-like gap between the two shell elements is minimized.

Figure 4:
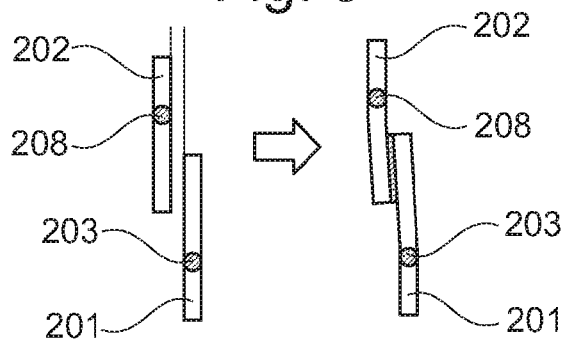
FIG. 4 shows an assembly process according to another exemplary embodiment of the present disclosure.

FIG. 4 depicts the situation shown on the right-hand side of FIG. 1, in which the lower end section of the upper shell element 202 and the upper end section of the lower shell element 201 are parallel to each other but spaced apart.

By bending the lower end section of the upper shell element 202 in the area of the bending area 208 in counterclockwise direction and by bending the upper end section of the lower shell element 201 in the bending area 203 also in counterclockwise direction, the gap between the two shell elements can be closed, as depicted on the right-hand side of FIG. 4.

After the bending steps a final curing of the shell elements and in particular of the first regions in the shell elements may be performed.

Consequently, the teachings of the present disclosure provide fast and flexible manufacturing solutions. No preparation of the surfaces of the shell elements may be necessary. In particular, no shimming is necessary to close gaps between neighboring shell elements. Consequently, manufacturing tolerances can be compensated in a cost-efficient manner without adding weight to the components.

Still further, due to the reduced impact of tolerances arising during manufacturing of the composite shell elements, larger fuselage structures may be assembled. Furthermore, simpler/faster assembly processes have also more potential to be applied in harsh environments such as in space.

Figure 5:
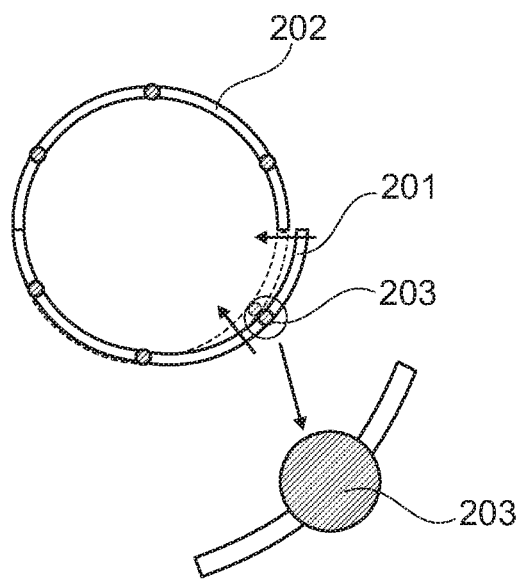
FIG. 5 shows an assembly process of a large scale structure according to another exemplary embodiment of the present disclosure.
Figure 6:
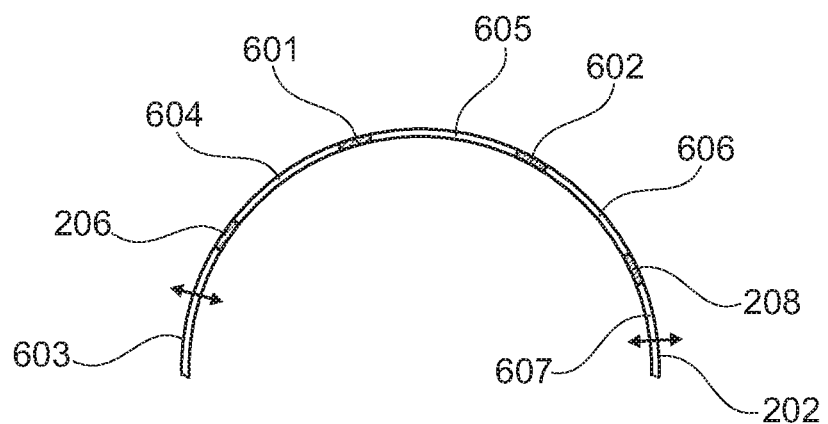
FIG. 6 shows a production process of composite shell elements according to an exemplary embodiment of the present disclosure.
Figure 7:
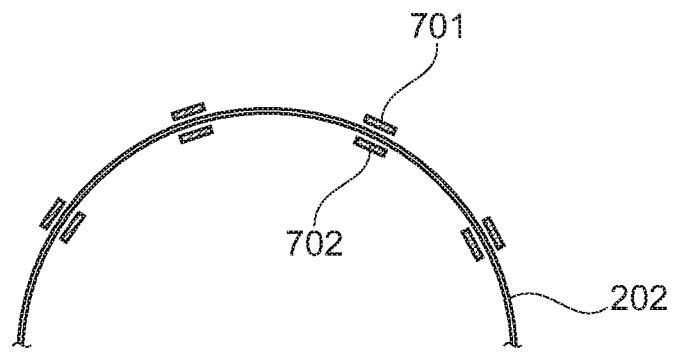
FIG. 7 shows a production process of composite shell elements according to another exemplary embodiment of the present disclosure.

FIGS. 5 to 7 show different methods for providing the first and second regions of the composite shell element in which the resin is cured to different degrees. It should be noted that the three methods can be used for the same shell element and that even more than one of the three methods may be used for the same region.

FIG. 5 shows a local thickening of the composite shell elements 201, 202. The local thickening, e.g. thickening 203, may have a circular or elliptical cross-sectional shape.

The curing cycle may be performed in such a way that the core area within the thickened part is not entirely cured. This area which is still "wet" will allow a minor deformation at the bending nodes.

Finally, a second curing cycle is performed locally in order to yield the final and tolerance compensated shape of the shell section.

FIG. 6 shows the application of an alternating resin pattern in which the first regions 206, 601, 602, 208 of the shell element 202 comprise a first resin and the remaining, second regions 603, 604, 605, 606, 607 of the shell element 202 comprise a second resin, which is hard and stiff after the first curing cycle, wherein the first resin is still "wet" and deformable after the first curing cycle. This may be realized by employing a resin which cures at a different temperature and/or exclusively under the influence of microwaves or ultraviolet light.

As a consequence, the shape of the areas or regions comprising the first resin can still slightly be modified without damaging the laminate after the first curing cycle.

By this way gaps in the longitudinal joint area between the two shell elements may be closed without difficulties in the MCA, before applying a final local curing on all surfaces comprising the first resin in order to give the shell element its final shape.

FIG. 7 shows the application of local heat shields and/or cooling devices in the autoclave process. The local shields 701, 702 are arranged above the outer surface and below the inner surface of the first regions. The heat shields or cooling devices 701, 702 prevent a 100% curing in predefined areas, i.e., in the first regions during the autoclave process.

By this way it is possible to provide sections that are not completely cured yet and still flexible for final tolerance compensation.

Figure 8:
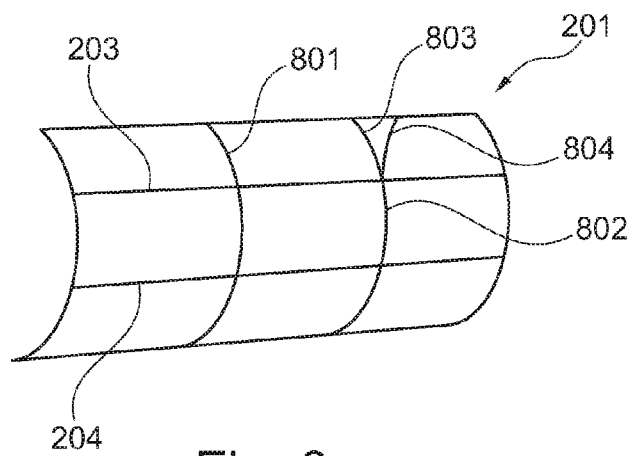
FIG. 8 shows a composite shell element according to another exemplary embodiment of the present disclosure.

FIG. 8 shows a composite shell element 201 which comprises two first regions 801, 802 arranged transversally, i.e., along the circumference of the later shell section, and two longitudinally arranged first regions 203, 204. It should be noted that region 204 is slightly curved and does therefore not define a straight bending line and that region 802 forks into two parts 803, 804 at its upper end. It should further be noted that FIG. 8 is a schematic representation and that each shell element may comprise another number of first regions which may be shaped very differently from the ones depicted in FIG. 8.

Figure 9:
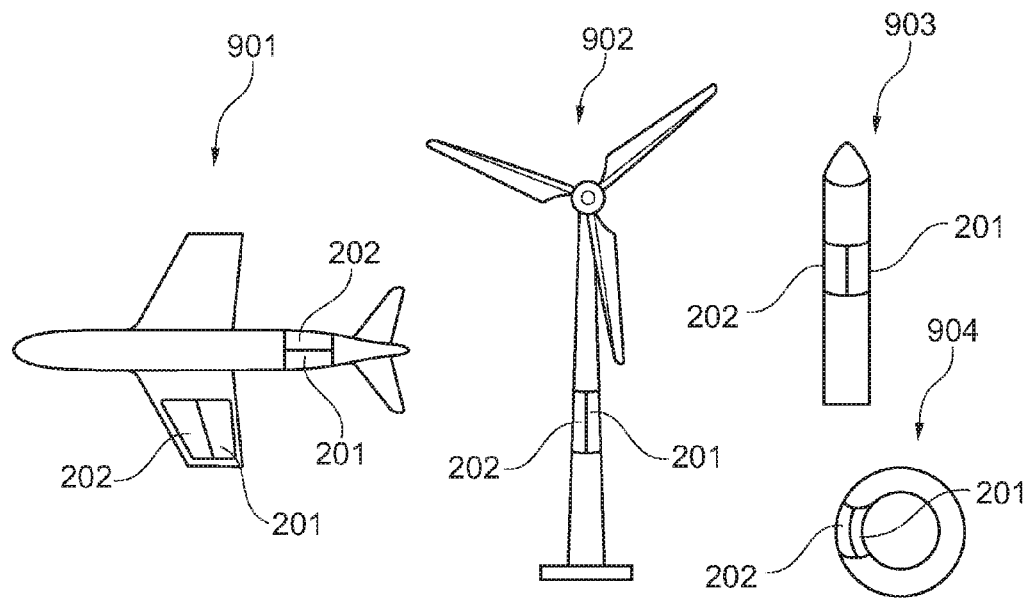
FIG. 9 shows means of transport according to exemplary embodiments of the present disclosure.

FIG. 9 shows four examples of large scale structures comprising composite shell elements 201, 202. The first structure is an aircraft 901, in which the fuselage comprises such shell elements. Furthermore, also the wings comprise such composite shell elements.

The second structure is a wind power plant in which the mast comprises shell elements 201, 202 and the third structure 903 is a carrier rocket or a module of a space station comprising shell elements 201, 202. The fourth structure is a space station 904, which comprises two or more shell elements 201, 202.

Figure 10:
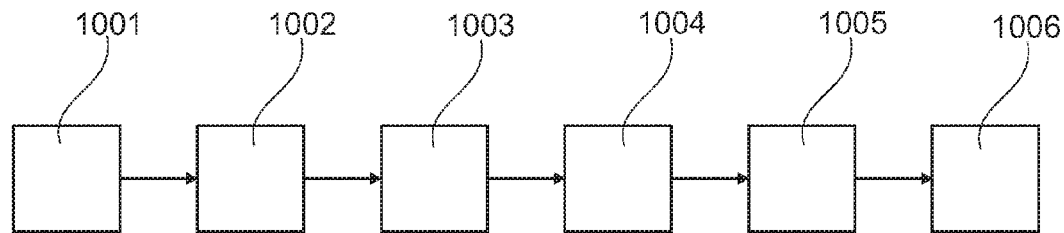
FIG. 10 shows a flow-chart of a method according to an exemplary embodiment of the present disclosure.

FIG. 10 shows a flow-chart of an embodiment according to an exemplary embodiment of the present disclosure. In 1001 a first region in a composite shell element is provided and in 1002 a second region in the composite shell element is provided. In 1003 the resin in the first region is cured to a degree which is lower than the curing degree of the resin in the second region.

Then, in 1004, a plurality of shell elements are assembled to form a fuselage section and in 1005 one of the shell elements (or more than one of the shell elements) is deformed in the area of a bending line defined by the first region after which, in 1006, a final curing cycle is performed, in order to cure the resin in the first region of the shell elements completely.

It should be noted that the term "comprising" does not rule out a plurality. Let it further be noted that features described with reference to one of the above exemplary embodiments can also be used in combination with other features of other exemplary embodiments described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method of forming a large scale structure comprising a plurality of composite shell elements, the method comprising:

providing a plurality of first regions of a first composite shell element, the first regions having the form of straight lines being arranged with a distance from each of opposite edges of the first composite shell element, in which plurality of first regions a resin of the composite shell element is cured to a first degree; and providing a plurality of remaining, second regions of the first composite shell element in which the resin of the composite shell element is cured to a second degree which is higher than the first degree, such that a flexibility of the first regions is greater than a flexibility of the second regions, wherein each of the first regions defines a bending line along which the composite shell element is foldable;

assembling the plurality of composite shell elements to form a large scale structure; and deforming the first composite shell element in the area of at least one of the bending lines in order to close a gap between two composite shell elements.

2. The method of claim 1,
wherein the first region has an elongated shape which runs from one edge of the composite shell element to another edge of the composite shell element.

3. The method of claim 1,
wherein the first region is arranged in a longitudinal direction of the composite shell element.

4. The method of claim 1,
wherein the first region is arranged in a transversal direction of the composite shell element.

5. The method of claim 1,
wherein the first region comprises a curved section.

6. The method of claim 1,
wherein the composite shell element has a greater thickness in the first region than in the second region.

7. The method of claim 1, further comprising:
providing a first resin in the first region; and
providing a second resin in the second region,
wherein the first resin has different curing properties than the second resin.

8. The method of claim 1, further comprising:
curing the resin in the first region at a different temperature than the resin in the second region.

9. The method of claim 1, further comprising:
bending the composite shell element along the bending line defined by the first region.

10. The method of claim 9, further comprising:
final curing of the resin in the first region.

11. The method of claim 1 further comprising: assembling a multi component structure comprising at least two of the composite shell elements.

* * * * *